United States Patent
Barry

(10) Patent No.: US 9,724,763 B2
(45) Date of Patent: Aug. 8, 2017

(54) BIT FOR A ROTARY DRILL

(75) Inventor: John James Barry, County Clare (IE)

(73) Assignee: Element Six Limited, County Clare (IE)

( * ) Notice: Subject to any disclaimer, the term of this patent is extended or adjusted under 35 U.S.C. 154(b) by 404 days.

(21) Appl. No.: 13/988,332

(22) PCT Filed: Nov. 22, 2011

(86) PCT No.: PCT/EP2011/070666
§ 371 (c)(1),
(2), (4) Date: Jun. 10, 2013

(87) PCT Pub. No.: WO2012/069465
PCT Pub. Date: May 31, 2012

(65) Prior Publication Data
US 2014/0037393 A1    Feb. 6, 2014

(30) Foreign Application Priority Data
Nov. 25, 2010   (GB) .................................. 1019952.9

(51) Int. Cl.
B23B 51/02    (2006.01)
B23B 51/00    (2006.01)

(52) U.S. Cl.
CPC .............. B23B 51/00 (2013.01); B23B 51/02 (2013.01); *B23B 2226/125* (2013.01); *B23B 2226/315* (2013.01); *B23B 2251/446* (2013.01); *Y10T 408/81* (2015.01); *Y10T 408/9095* (2015.01)

(58) Field of Classification Search
CPC .............. B23B 51/02; B23B 2251/446; B23B 2226/315; Y10T 408/81; Y10T 408/9095
See application file for complete search history.

(56) References Cited

U.S. PATENT DOCUMENTS

| 4,561,813 A | 12/1985 | Schneider |
| 4,830,000 A | 5/1989 | Shutt |
| 5,580,196 A * | 12/1996 | Thompson .............. B23B 51/02 407/119 |
| 5,716,170 A * | 2/1998 | Kammermeier ........ B23B 51/02 407/119 |

(Continued)

FOREIGN PATENT DOCUMENTS

| EP | 0172148 A | 2/1986 |
| FR | 2654663 A | 5/1991 |

(Continued)

OTHER PUBLICATIONS

International Search Report for PCT/EP2011/070666 dated Feb. 24, 2012.

(Continued)

*Primary Examiner* — Eric A Gates
(74) *Attorney, Agent, or Firm* — Armstrong Teasdale LLP

(57) ABSTRACT

A bit for a rotary drill, the bit including a cylindrical body having at least two flutes provided therein, the cylindrical body terminating in a cutting end; and a cylindrical land defined by a peripheral face of the cylindrical body between adjacent flutes, the cylindrical land including a margin that is radially elevated relative to a remainder of the cylindrical land; the margin having a width that varies along the length of the cylindrical land.

2 Claims, 1 Drawing Sheet

(56) References Cited

U.S. PATENT DOCUMENTS

| | | | |
|---|---|---|---|
| 5,813,804 A * | 9/1998 | Erdel | B23B 51/02 408/145 |
| 7,101,125 B2 * | 9/2006 | Borschert et al. | 408/230 |
| 7,306,411 B2 * | 12/2007 | Mabuchi et al. | 408/230 |
| 7,338,237 B2 * | 3/2008 | Frejd | 408/230 |
| 8,734,068 B2 * | 5/2014 | Krieg et al. | 408/230 |
| 2003/0017015 A1 | 1/2003 | Strubler | |
| 2005/0249562 A1 | 11/2005 | Frejd | |
| 2010/0303568 A1 | 12/2010 | York | |
| 2011/0268518 A1 * | 11/2011 | Sampath | B23B 51/02 408/59 |
| 2013/0209183 A1 * | 8/2013 | Chuo | B23B 51/02 407/32 |

FOREIGN PATENT DOCUMENTS

| | | |
|---|---|---|
| JP | 2002137110 A | 5/2002 |
| JP | 2005199418 | 7/2005 |
| WO | 99/50014 | 10/1999 |
| WO | 2005 115667 A1 | 12/2005 |
| WO | 2010 044925 A1 | 4/2010 |

OTHER PUBLICATIONS

Search Report for GB1019952.9 dated Mar. 17, 2011.
Search Report for GB1120116.7 dated Mar. 8, 2012.

* cited by examiner

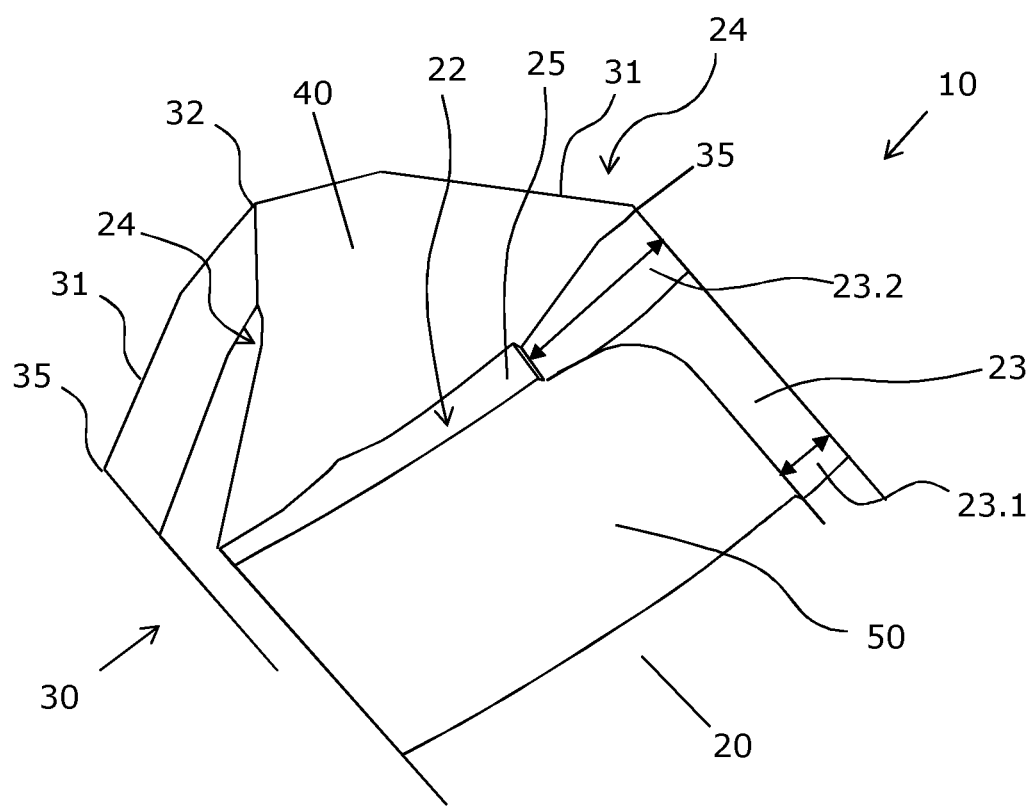

BIT FOR A ROTARY DRILL

This disclosure relates generally to a bit for a rotary drill, and more particularly, but not exclusively, to a fluted, polycrystalline diamond (PCD) tip, twist drill.

A twist drill can generally be described as a rotary end cutting tool having one of more cutting faces or lips, and also one or more helical or straight flutes for conveying chip from a hole being drilled. Twist drills may be used for drilling holes in metal, plastic, wood and also masonry. Twist drills can be manufactured from a variety of materials such as low carbon steel, high carbon steel, high speed steel, cobalt steel or carbide material. Twist drills may comprise wear resistant tips, which may tungsten carbide points that are secured to the drill body.

U.S. Pat. No. 5,580,196 discloses twist drill bits comprising a layer of polycrystalline diamond (PCD) material or polycrystalline cubic boron nitride (PCBN) material of substantially uniform axial thickness extending over substantially the whole top surface of the tip of the drill. Japanese patent application publication number 2001-252811 discloses a drill comprising a tip including a cBN or diamond layer.

Certain materials, particularly but not exclusively super-hard materials such as PCD and PCBN, may be relatively wear resistant but also relatively brittle and may be prone to chipping and fracture in use. For example, there is a risk that a drill tip comprising a super-hard material may chip at the point of the tip when used to bore into a hard material. Since the tip may play a role in fixing the lateral location of the drill within the hole, even a small amount of chipping of the tip may result in reduced accuracy in the hole dimensions. This problem is likely to be particularly significant for deeper holes and holes for which high accuracy is required.

This disclosure provides a bit for a rotary drill comprising a cylindrical body having at least two flutes provided therein, the cylindrical body terminating in a cutting end; and a cylindrical land defined by a peripheral face of the cylindrical body between adjacent flutes, the cylindrical land including a margin that is radially elevated relative to a remainder of the cylindrical land; the margin having a width that varies along the length of the cylindrical land. The bit and drill may be for a machine tool for machining bodies comprising metal, composite materials, fibre-reinforced polymer materials, particularly but not exclusively in an industrial manufacturing environment such as in the aerospace or automotive industries.

Various combinations and arrangements are envisaged by this disclosure, of which the following are non-exclusive and non-exhaustive examples. For example, the margin may include a wide zone and a narrow zone, with the wide zone being located towards the cutting end of the bit, and or the wide zone of the margin may be located adjacent a cutting edge of the bit. The tip of the bit may comprise super-hard material such as PCD material. The point of the drill may include a PCD volume and the wide zone of the margin may form part of the PCD volume. In one example arrangement, the PCD volume may be a PCD layer.

The cylindrical land of a twist drill is the peripheral portion of the body of the drill between adjacent flutes. The cylindrical land of the drill may be designed to provide a degree of clearance between the drill body and the surface of the hole being produced. However, it may also serve to guide the drill on a straight trajectory, and a portion of the land that extends further radially outwardly than the remainder of the land is referred to as the margin. The margin provides the guiding functionality referred to above. However, where the margin is too wide, especially on steel and cemented carbide drills, it is likely to result in excessive friction between the drill and the hole surface, thereby increasing the torque required to rotate the drill, whilst also having a detrimental effect on the surface finish of the hole. The magnitude of the traction exerted by the margin is dictated by the coefficient of friction between the tool material and the work material. If the margin is of uniform width along the fluted portion of the drill and is also relatively narrow in order to reduce friction between the drill bit and the body being drilled, there is a risk of inferior guiding of the drill relative to the hole.

Bit arrangements according to this disclosure may have the aspect of reduced risk of inadequate hole dimension accuracy. It is also likely that this may be achieved without a substantial increase in applied torque.

A non-limiting example will be described with reference to the accompanying drawing, FIG. 1, which shows a schematic side view of a forward end of an example twist drill (only the end part of the drill bit is shown).

This disclosure relates at least partly to the configuration of the cylindrical land of a drill, and more particularly to the margin of the cylindrical land. In the example arrangement illustrated in FIG. 1, a drill bit 10 comprises a PCD structure (or volume) 40 joined to a cemented carbide substrate 50, which is joined to a steel body 20. The point 30 of the drill bit 10 may also be referred to as the cutting end of the drill bit 10. The bit 10 has a peripheral cylindrical land 22, which is the peripheral part of the drill body that extends between two adjacent flutes 24 (one of which is visible in FIG. 1). The point 30 of the drill includes the primary cutting faces 31, as well as a chisel edge 32, which is basically the web that spans between two opposing flutes 24 of the drill. A cutting edge corner 35 is defined by an intersecting cutting face 31 and cylindrical land 22. A margin 23 of the cylindrical land 22 is elevated relative to the remainder of the cylindrical land 22 and the width of the margin 23 is not uniform along the length of the drill. The margin 23 includes a zone of reduced width 23.1 and a zone of increased width 23.2, the zone of the increased width 23.2 being located towards the point 30 of the drill 10. More particularly, the zone of increased width 23.2 is at least partly defined by the PCD layer 40. The reason for this is that PCD has a very low coefficient of friction, especially compared to that of the steel body 20 or carbide layer 50, and the extended margin 23.2 can therefore provide improved guidance of the drill without having a substantial impact on the torque required to rotate the drill.

The cylindrical body 20 may have two spiraling flutes provided therein, which in use will displace dislodged material, referred to as chip, from the hole (not shown) being drilled. Various flute geometries may be used and various aspects of flute geometry such as pitch, pitch angle, spiral/straight can be used for drill bits according to this disclosure. The cylindrical land 22 includes an elevated section 23, or margin, as well as a recessed section 25 that has been partially radially cut away in order to reduce the diameter of the cylindrical body at the recessed section 25, thus forming a step between the margin 23 and the recessed section 25. The recessed section 25 of the cylindrical land 22 is provided so as to provide a degree of clearance between the drill body and the surface of the hole being produced. The margin 23 serves to guide the drill on a straight trajectory as it abuts the surface of the hole being drilled. The margin 23 may also function as a secondary cutting face, intersecting with the primary cutting face 31 at a cutting edge corner 35.

It will be appreciated that the above is only one example arrangement a drill bit according to this disclosure and that there may be many variations without departing from the spirit or the scope of the disclosure. Although the example is described primarily with reference to a twist drill, it will be appreciated that the concepts can also be applied to other bits for rotary drills and cutters.

Certain terms and concepts as used herein will be briefly explained below.

The flutes, which may be either helical or straight (as defined relative to the axis of rotation of the drill), serve to convey the newly formed chip from the hole being drilled. The flutes can be geometrically configured in many ways, depending on the application of the drill, and the required removal rate of the chips. Another design consideration is the stiffness and strength of the drill because flutes of larger cross section reduce the strength and stiffness of the drill.

The point of the drill contains the cutting edges, which act to shear the work material into easily removable chips. The point also includes a chisel edge that is located symmetrically between the cutting edges, and concentric with an axis of rotation of the drill. In the simplest drills, the chisel edge geometry is determined by the web thickness, being the portion of material that separates the flutes. As the web portion of a drill does not cut work material, but rather extrudes it outwardly from the centreline towards the cutting edges, its length is frequently minimised by forming notches at the intersection between the flutes and the drill point surface. The design of the drill point (web and notch geometry) partially influences its rotational accuracy i.e. the degree to which the drill rotates concentrically about the guiding mechanisms axis of rotation. Most drills used in the field contain two cutting edges as this is the most economical design.

In drilling into a work-piece, the work-piece material removed by the cutting action of the drill bit is typically in the form of pieces called "chips". A rake face is understood to mean the surface of a drill bit or cutting insert over which the chips flow. A rake angle is the inclination of a rake face relative to the work-piece surface, a positive rake angle permitting chips to move away from the work-piece and a negative rake angle directing chips towards the work-piece.

Synthetic and natural diamond, polycrystalline diamond (PCD), cubic boron nitride (cBN) and polycrystalline cBN (PCBN) material are examples of super-hard materials. As used herein, synthetic diamond, which is also called man-made diamond, is diamond material that has been manufactured. As used herein, polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising a catalyst material for synthetic diamond, or they may be substantially empty. As used herein, a catalyst material for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains. As used herein, PCBN material comprises grains of cubic boron nitride (cBN) dispersed within a matrix comprising metal or ceramic material.

The invention claimed is:

1. A bit for a rotary drill, the bit including a cylindrical body having at least two flutes provided therein, the cylindrical body terminating in a cutting end; and a cylindrical land defined by a peripheral face of the cylindrical body between adjacent flutes, the cylindrical land including a margin that is radially elevated relative to a remainder of the cylindrical land; the margin having a width that varies along the length of the cylindrical land and including a wide zone and a narrow zone, the wide zone being located towards the cutting end of the drill and adjacent a cutting edge of the drill, wherein a point of the drill includes a polycrystalline diamond (PCD) volume in the form of a PCD layer, wherein the wide zone of the margin is at least partially defined by the PCD layer, and wherein the PCD layer covers the entire cutting point.

2. The bit of claim 1 further including a carbide substrate, wherein the PCD layer is formed on the carbide substrate and the narrow zone is defined by the carbide substrate.

* * * * *